United States Patent
Czyszczewski et al.

(10) Patent No.: US 7,400,430 B2
(45) Date of Patent: Jul. 15, 2008

(54) DETECTING AND COMPENSATING FOR COLOR MISREGISTRATION PRODUCED BY A COLOR SCANNER

(75) Inventors: Joseph Stanley Czyszczewski, Longmont, CO (US); Hong Li, Boulder, CO (US); James T. Smith, II, Boulder, CO (US); Mikel John Stanich, Longmont, CO (US); Gerhard Robert Thompson, Wappingers Falls, NY (US); Chai Wah Wu, Poughquag, NY (US)

(73) Assignee: InfoPrint Solutions Company, LLC., Boulder, CO (US)

( * ) Notice: Subject to any disclaimer, the term of this patent is extended or adjusted under 35 U.S.C. 154(b) by 851 days.

(21) Appl. No.: 10/672,234

(22) Filed: Sep. 25, 2003

(65) Prior Publication Data

US 2005/0069220 A1   Mar. 31, 2005

(51) Int. Cl.
   *H04N 1/58* (2006.01)
   *G03F 3/08* (2006.01)
(52) U.S. Cl. .................. 358/515; 358/504; 358/518
(58) Field of Classification Search ............... 358/1.9, 358/2.1, 474, 504, 512, 515, 518, 532; 399/178
   See application file for complete search history.

(56) References Cited

U.S. PATENT DOCUMENTS 5,000,570 A   3/1991   Neilson et al. ............. 356/308
6,034,795 A   3/2000   Smitt .......................... 358/525
6,587,224 B1 *   7/2003   Nabeshima et al. ......... 358/1.9
2002/0141003 A1   10/2002   Chang et al. .............. 358/518

FOREIGN PATENT DOCUMENTS

JP      60230760 A      11/1985

* cited by examiner

Primary Examiner—King Y. Poon
Assistant Examiner—Peter L Cheng
(74) Attorney, Agent, or Firm—Duft Bornsen & Fishman, LLP (57) ABSTRACT

A method, computer program product and system for detecting and compensating for color misregistration. A black/white edge or a solid color edge on a target may be scanned. A black/white edge may refer to a black image, e.g., black text, on a white surrounding background having a rapid spatial transition from black to white. A solid color edge may refer to a solid color image, e.g., solid color text, on a white surrounding background having a rapid spatial transition from color to white. A curve of gray values versus spatial pixel positions for each color channel, e.g., red, green and blue color channels, may be generated. A misregistration error may then be calculated by calculating the offset between the color channel curves. The misregistration error may then be used to calibrate the scanner to compensate for the detected color misregistration.

16 Claims, 7 Drawing Sheets

DETECTING AND COMPENSATING FOR COLOR MISREGISTRATION PRODUCED BY A COLOR SCANNER

TECHNICAL FIELD

The present invention relates to the field of color scanners, and more particularly to a color scanner configured to detect and compensate for color misregistration by computing the offset between the color planes.

BACKGROUND INFORMATION

Conventionally, a color scanner may include a unit configured to photoelectrically scan an image and convert the image into digital information. Such a unit may be referred to as a "reading unit." A reading unit may include an illumination system, e.g., fluorescent white light, incandescent lamp source, Light Emitting Diodes (LEDs), that produces light which is reflected from the document to be scanned. The light reflected from the document is directed through a focusing device to filter out the primary colors into particular linear Charge Coupled Device (CCD) arrays, e.g., a red CCD array, a green CCD array, and a blue CCD array. Hence, the reflected image of the document may be separated into the primary colors which are directed onto separate CCD arrays. A color scanner may further include an apparatus configured to move the location where the reading unit is measuring so as to digitize an entire two dimensional area.

The CCD arrays may be configured to read the reflected light from the same portion of the document either at different times or simultaneously. In either case, the red color CCD array is activated to read a line scan image in a plane, referred to as a "red color plane." Further, the green color CCD array is activated to read a line scan image in a plane, referred to as the "green color plane" and the blue color CCD array is activated to read a line scan image in a plane, referred to as the "blue color plane." If these color planes are not aligned, a phenomenon, commonly referred to as "color misregistration," may occur.

Color misregistration may cause black or color text, or in the case of an image or graphic having edges, cause it to become blurred with color outlines. This is especially problematic when making copies of such text, graphics or images with blurred color outlines, as the copying process adds additional color misregistration from the printer. Further, if color misregistration is different in the horizontal and vertical directions when the text is converted to black, then the relative thickness of text strokes may also be different horizontally and vertically thereby causing the text to appear unbalanced.

Currently, the methods for detecting and correcting color misregistration involve complex computations using significant processing power.

Therefore, there is a need in the art to detect and calculate the amount of color misregistration using a simple algorithm that may be used to calibrate the color scanner to compensate for the detected color misregistration.

SUMMARY

The problems outlined above may at least in part be solved in some embodiments by generating curves of gray values versus spatial pixel positions for each color channel, e.g., red, green and blue color channels, at a black/white edge or at a solid color edge. A misregistration error may then be determined by calculating the offset between the color channel curves.

In one embodiment of the present invention, a method for detecting and compensating for color misregistration may comprise the step of scanning either a black/white edge or a solid color edge on a target, e.g., document. The method may further comprise generating a curve of gray values versus pixel spatial position for each color channel using either the black/white edge or the solid color edge scanned. The method may further comprise calculating a misregistration error by calculating an offset between the color channels. The method may further comprise calibrating a unit, e.g., scanner, using the calculated misregistration error.

The foregoing has outlined rather generally the features and technical advantages of one or more embodiments of the present invention in order that the detailed description of the invention that follows may be better understood. Additional features and advantages of the invention will be described hereinafter which may form the subject of the claims of the invention.

BRIEF DESCRIPTION OF THE DRAWINGS

A better understanding of the present invention can be obtained when the following detailed description is considered in conjunction with the following drawings, in which.

DETAILED DESCRIPTION

The present invention comprises a method, computer program product and system for detecting and compensating for color misregistration. In one embodiment of the present invention, a black/white edge or a solid color edge on a document or test target may be scanned. A black/white edge refers to a black image, e.g., black text, on a white surrounding background having a rapid spatial transition from black to white. A solid color edge refers to a solid color image, e.g., solid color text, on a white surrounding background having a rapid spatial transition from color to white. A curve of gray values versus spatial pixel positions for each color channel, e.g., red, green and blue color channels, may be generated. A misregistration error may then be determined by calculating the offset between the color channel curves. The misregistration error may be used to calibrate the scanner to compensate for the detected color misregistration.

Although the present invention is described with reference to a copier system comprising multiple printer/scanner units, it is noted that the principles of the present invention may be applied to stand alone scanners or any system that incorporates a scanner. It is further noted that embodiments applying the principles of the present invention to such stand-alone scanners, or systems that incorporate a scanner, would fall within the scope of the present invention.

It is further noted that even though the present invention is described with reference to a sequential color scanner, that the principles of the present invention may be applied to a single pass (simultaneous) color scanner. It is further noted that embodiments applying the principles of the present invention to such simultaneous color scanners would fall within the scope of the present invention.

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted in as much as such details are not necessary to obtain a complete understanding of the present invention and are believed to be within the skills of persons of ordinary skill in the relevant art.

Figure 1:
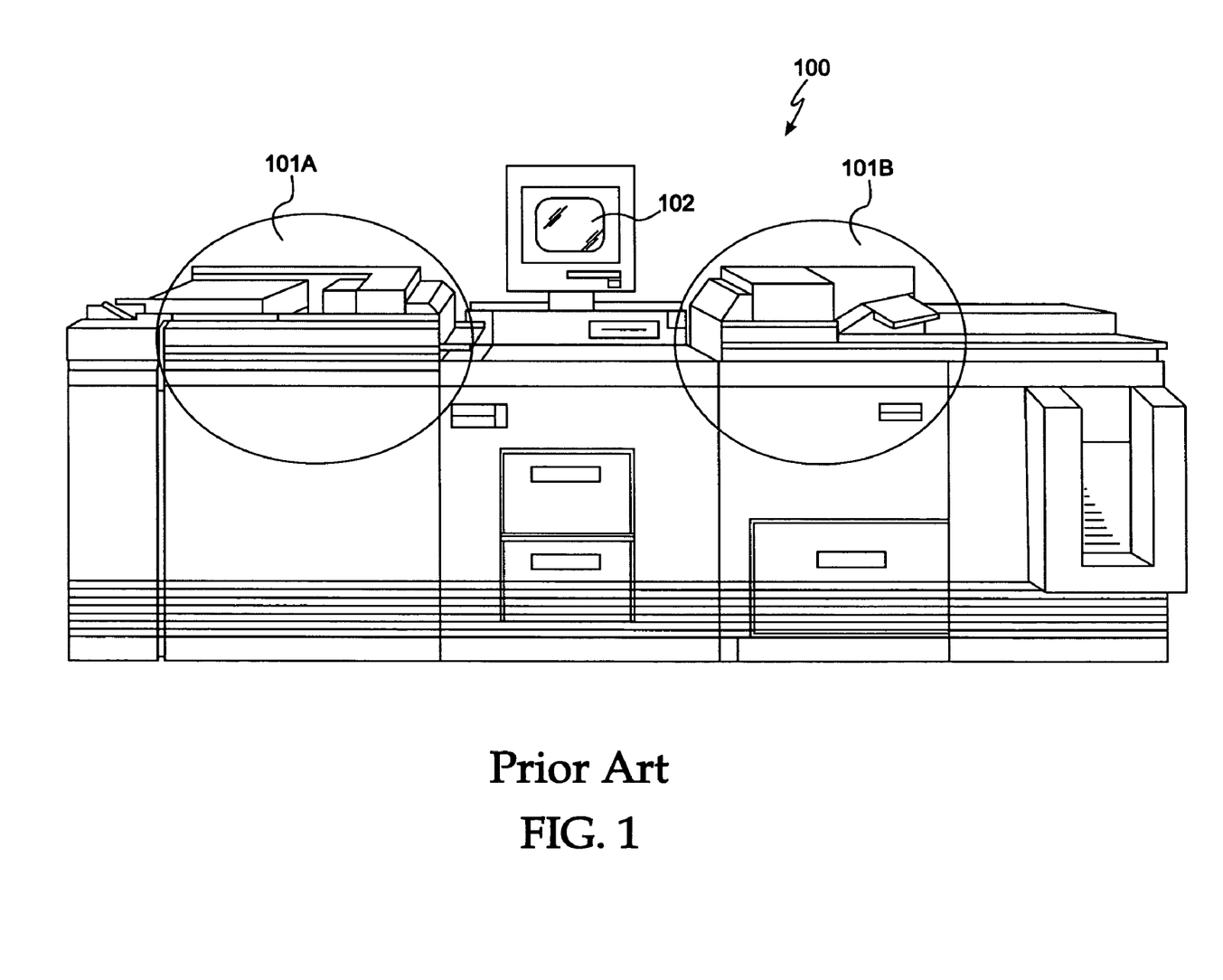
FIG. 1 illustrates a copier system configured as presently know in the art.

FIG. 1—Copier

FIG. 1 illustrates an embodiment of a copier system 100 in accordance with the present invention. Copier system 100 may comprise a plurality of printer-scanner units 101A-B configured to both print copies of documents and scan documents. Printer-scanner units 101A-B may collectively or individually be referred to as printer-scanner units 101 or printer-scanner unit 101, respectively. Printer-scanner units 101 may be controlled by a user via a touch dialog screen 102. Printer-scanner units 101 may include a color scanner as discussed below in conjunction with FIG. 2.

Figure 2:
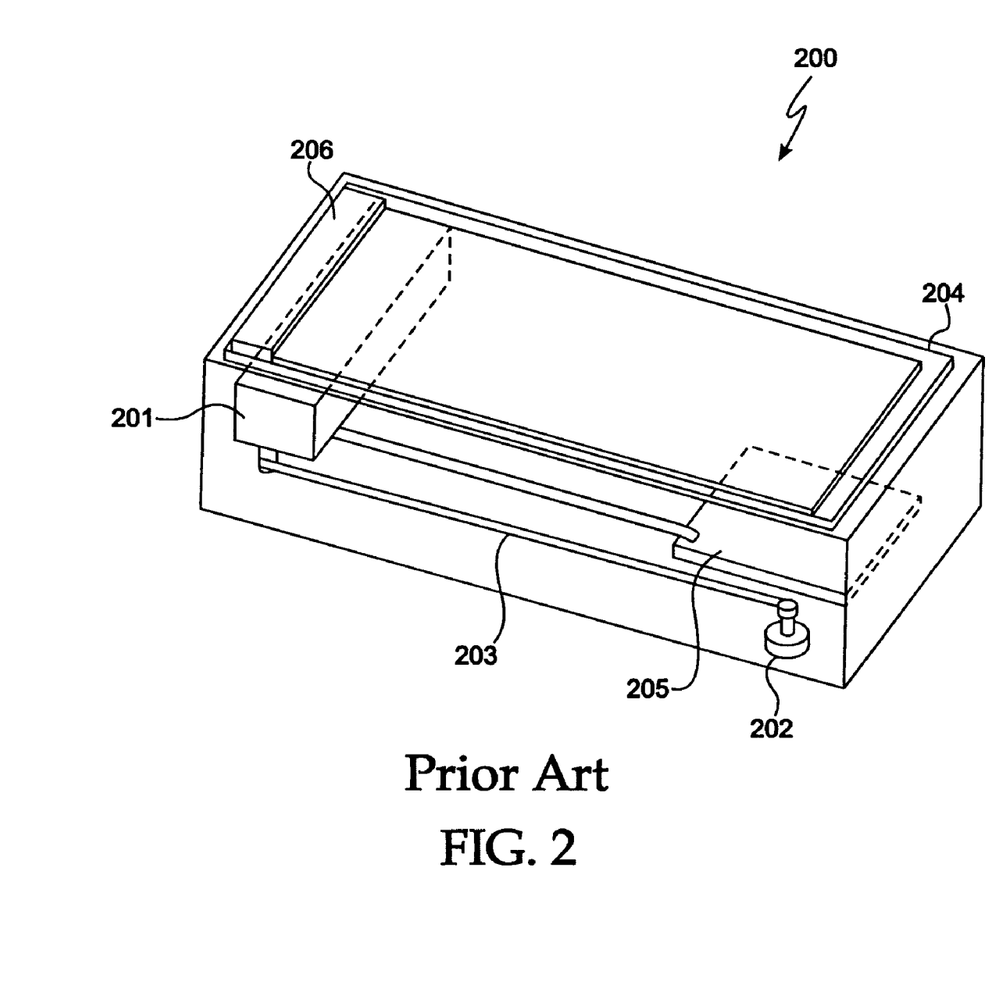
FIG. 2 illustrates an embodiment of a scanner as presently known in the art.

FIG. 2—Color Scanner

FIG. 2 illustrates an embodiment of a color scanner 200 configured to scan an image, e.g., picture, document. Color scanner 200 may include a reading unit 201, a stepping motor 202, a belt 203, a glass table 204, a controller 205, and a white correction plate 206. Reading unit 201 may be configured to scan an image and convert the scanned image into corresponding digital signals as discussed in greater detail further below in conjunction with FIG. 3. Controller 205 may be configured to drive stepping motor 202 which moves reading unit 201 via belt 203. Consequently, reading unit 201 may scan the image placed on glass table 204 while continuously moving along glass table 204. White correction plate 206 may be configured to store control values for the illumination source, e.g., fluorescent white light, incandescent lamp source, Light Emitting Diodes (LEDs), in reading unit 201 configured to emit light onto glass table 204. It is noted that color scanner 200 may include other and/or additional elements that, for clarity, are not depicted. It is further noted that FIG. 2 is illustrative of an embodiment of color scanner 200 but the principles of the present invention is not to be limited in scope to any one particular embodiment.

Figure 3:
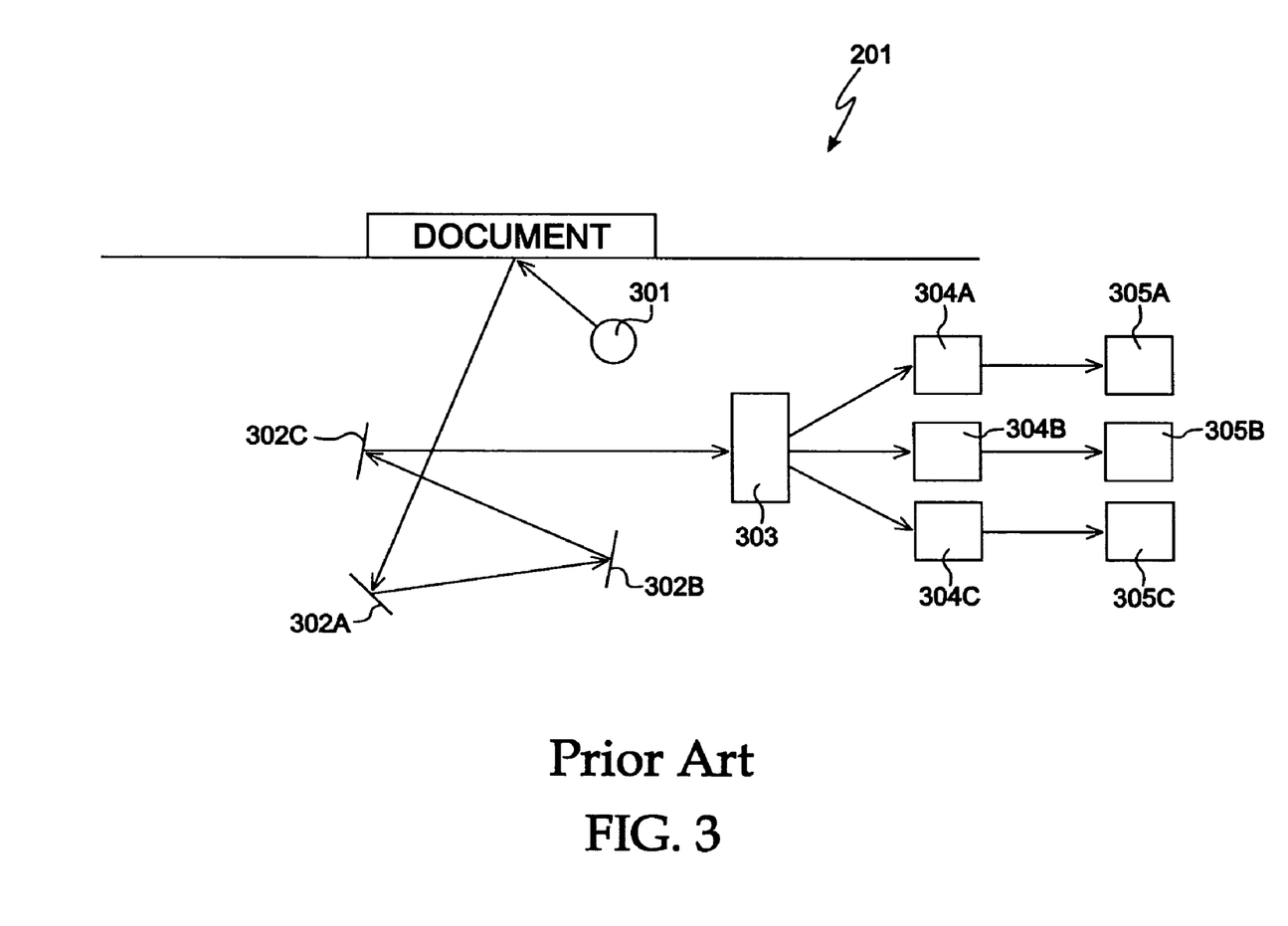
FIG. 3 illustrates an embodiment of a reading unit in a scanner as presently known in the art.

FIG. 3—Reading Unit

FIG. 3 illustrates an embodiment of the present invention of reading unit 201. As stated above, reading unit 201 may be configured to scan an image and convert the scanned image into corresponding digital signals. Reading unit 201 may include an illumination source 301, e.g., fluorescent white light, incandescent lamp source, Light Emitting Diodes (LEDs), to emit light onto glass table 204 (FIG. 2). The light from illumination source 301 may be reflected from the document scanned on glass table 204. The light reflected from the document may be directed to a lens 303 through a series of mirrors 302A-C. Lens 303 may split the image into three smaller versions of the original. Each smaller version may pass through a color filter 304A-C, e.g., red color filter 304A, green color filter 304B, blue color filter 304C, into particular linear Charge Coupled Device (CCD) arrays 305A-C, e.g., red CCD array 305A, green CCD array 305B, blue CCD array 305C. Red CCD array 305A may be configured to read a line scan image containing red colors in a plane, referred to as a "red color plane". Furthermore, green CCD array 305B may be configured to read a line scan image containing green colors in a plane, referred to as a "green color plane". Similarly, blue CCD array 305C may be configured to read a line scan image containing blue colors in a plane, referred to as a "blue color plane". CCD arrays 305A-C may collectively or individually be referred to as CCD arrays 305 or CCD array 305, respectively. It is noted that reading unit 201 may include other and/or additional elements that, for clarity, were not depicted. It is further noted that FIG. 3 is illustrative of an embodiment of reading unit 201 but the principles of the present invention is not to be limited in scope to any one particular embodiment.

Referring to FIGS. 2 and 3, controller 205 may be configured to provide control signals to each CCD array 305 to activate them to read the same portion of a document either at different times or simultaneously. For example, in a single pass scanner, which has three physically separated CCD arrays such as illustrated in FIG. 3, red color CCD array 305A may be activated during a first period. During that period of activation, red color CCD array 305A may be activated to read a line scan image in the red color plane. Green color CCD array 305B may be activated in the next period and blue color CCD array 305C may be activated in the following period. Similarly, during their periods of activation, green color CCD array 305B may be activated to read a line scan image in the green color plane, and blue color CCD array 305C may be activated to read a line scan image in the blue color plane. The stored charge from the linear CCD arrays 305 may be outputted and converted to digital signals in response to pulses provided by controller 205.

As stated in the Background Information section, color misregistration from the scanner may cause black or color text, or an image or graphic having edges, to become blurred with color outlines. This is especially problematic when making copies of text, graphics or images having blurred color outlines, as the copying process adds additional color misregistration from the printer. Further, if color misregistration is different in both the horizontal and vertical directions when the text is converted to black, then the relative thickness of text strokes may also be different horizontally and vertically thereby causing the text to appear unbalanced. Currently, the methods for detecting and correcting color misregistration involve complex computations using significant processing power. Therefore, there is a need in the art to detect and calculate the amount of color misregistration using a simple algorithm that may be used to calibrate the color scanner to compensate for the detected color misregistration.

Figure 5:
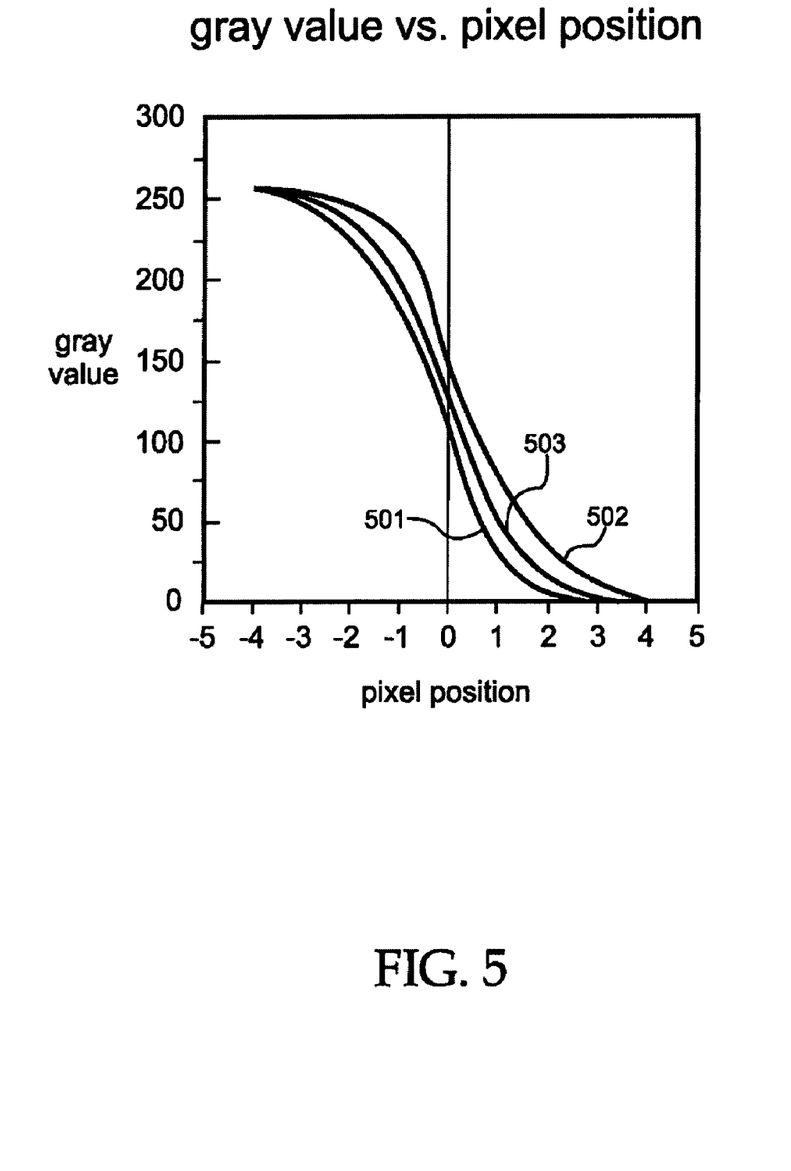
FIG. 5 is a plot of gray values for each color channel for a black/white edge scanned in accordance with an embodiment of the present invention.
Figure 6A:
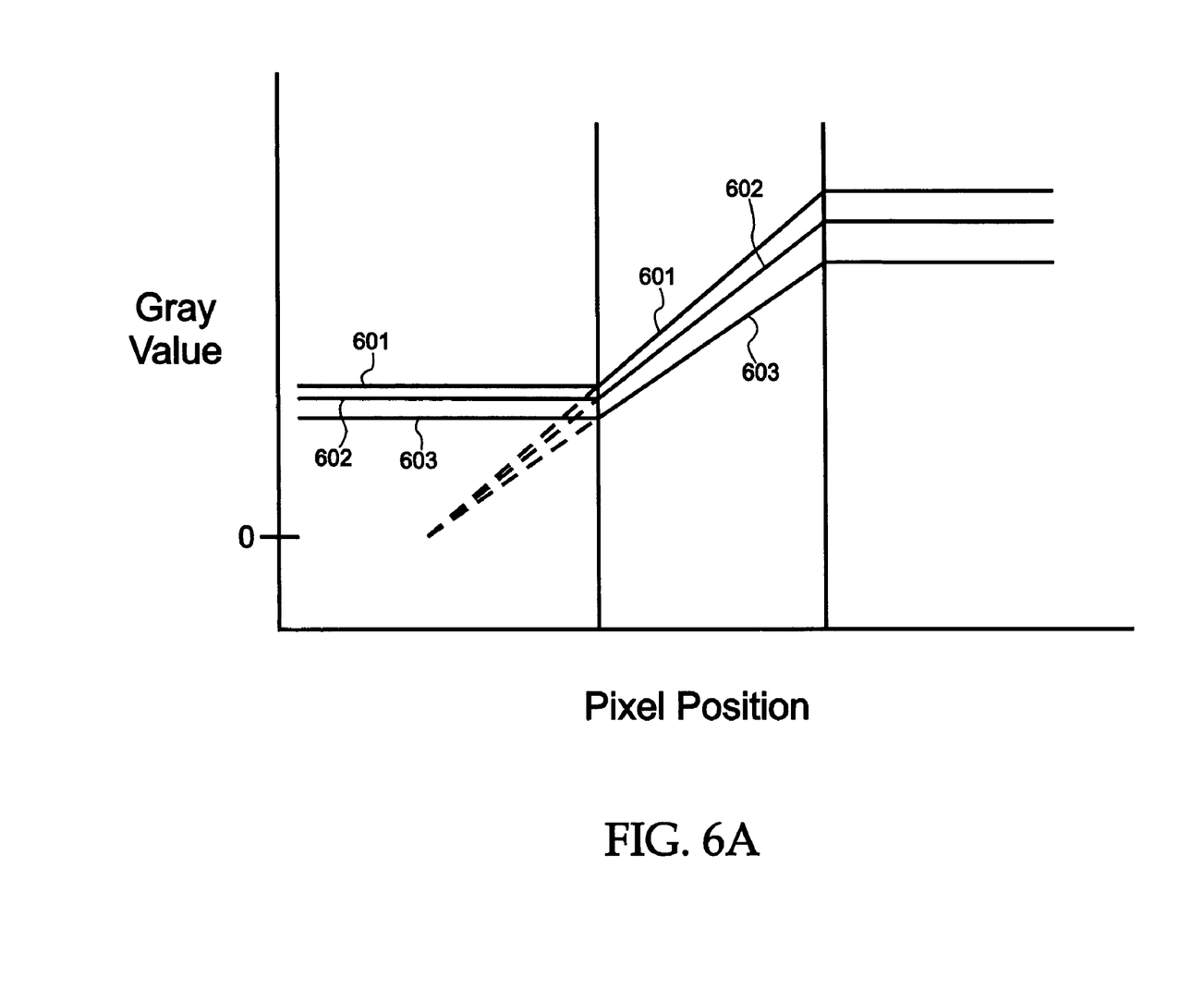
FIG. 6A is a plot of gray values for each color channel for a solid color edge scanned in accordance with an embodiment of the present invention for the case of no color misregistration.
Figure 6B:
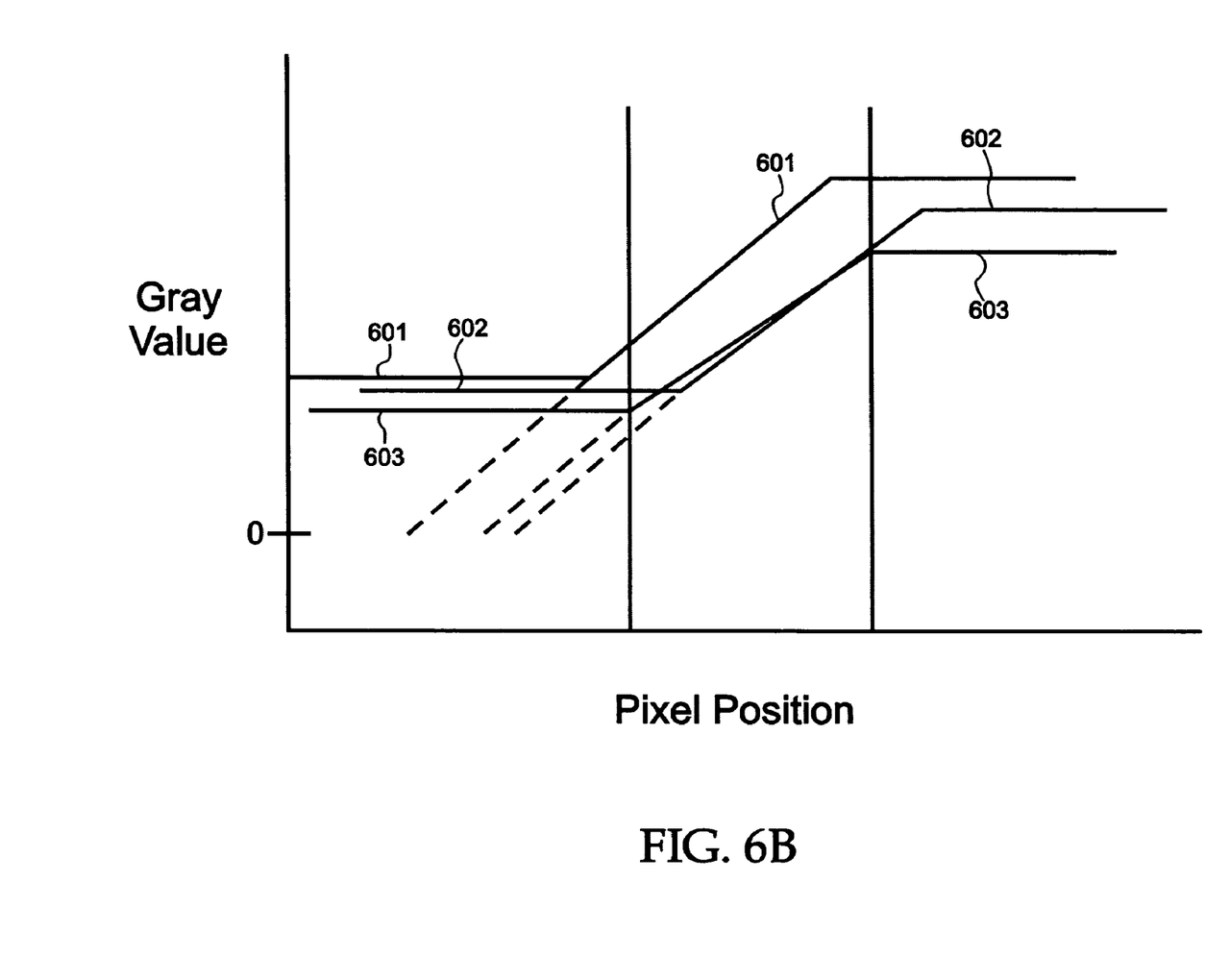
FIG. 6B is a plot of gray values for each color channel for a solid color edge scanned in accordance with an embodiment of the present invention for the case of color misregistration.

A simple algorithm for detecting and calculating the amount of color misregistration that may be used to calibrate the color scanner to compensate for the detected color misregistration is discussed below in conjunction with FIGS. 4-6. In one embodiment, the algorithm may be implemented by controller 205. Controller 205 may be configured in one embodiment to comprise a memory (not shown), e.g., non-volatile memory, to store a program to perform the steps of a method for detecting and calculating the amount of color misregistration as described below in conjunction with FIG.

4. Memory (not shown) may further be configured to store a misregistration error used to calibrate scanner 200. Controller 205 may further comprise a processor (not shown) coupled to the memory (not shown). The processor (not shown) may be configured to execute the instructions of the program. Those skilled in the art will appreciate that embodiments disclosed herein may be implemented as software program instructions capable of being distributed as one or more program products, in a variety of forms, including computer program products, and that the present invention applies equally regardless of the particular type of program storage media or signal bearing media used to actually carry out the distribution. Examples of program storage media and signal bearing media include recordable type media such as floppy disks, CD-ROM, and magnetic tape transmission type media such as digital and analog communications links, as well as other media storage and distribution systems.

It is further noted that the steps of the method performed by the program mentioned above may in an alternative embodiment be implemented in hardware such as in an Application Specific Integrated Circuit (ASIC). It is further noted that the algorithm for detecting and calculating the amount of color misregistration may be implemented by any unit in copier system 100 (FIG. 1) comprising a memory to store the algorithm. It is further noted that the algorithm for detecting and calculating the amount of color misregistration may be implemented in a stand-alone scanner.

Figure 4:
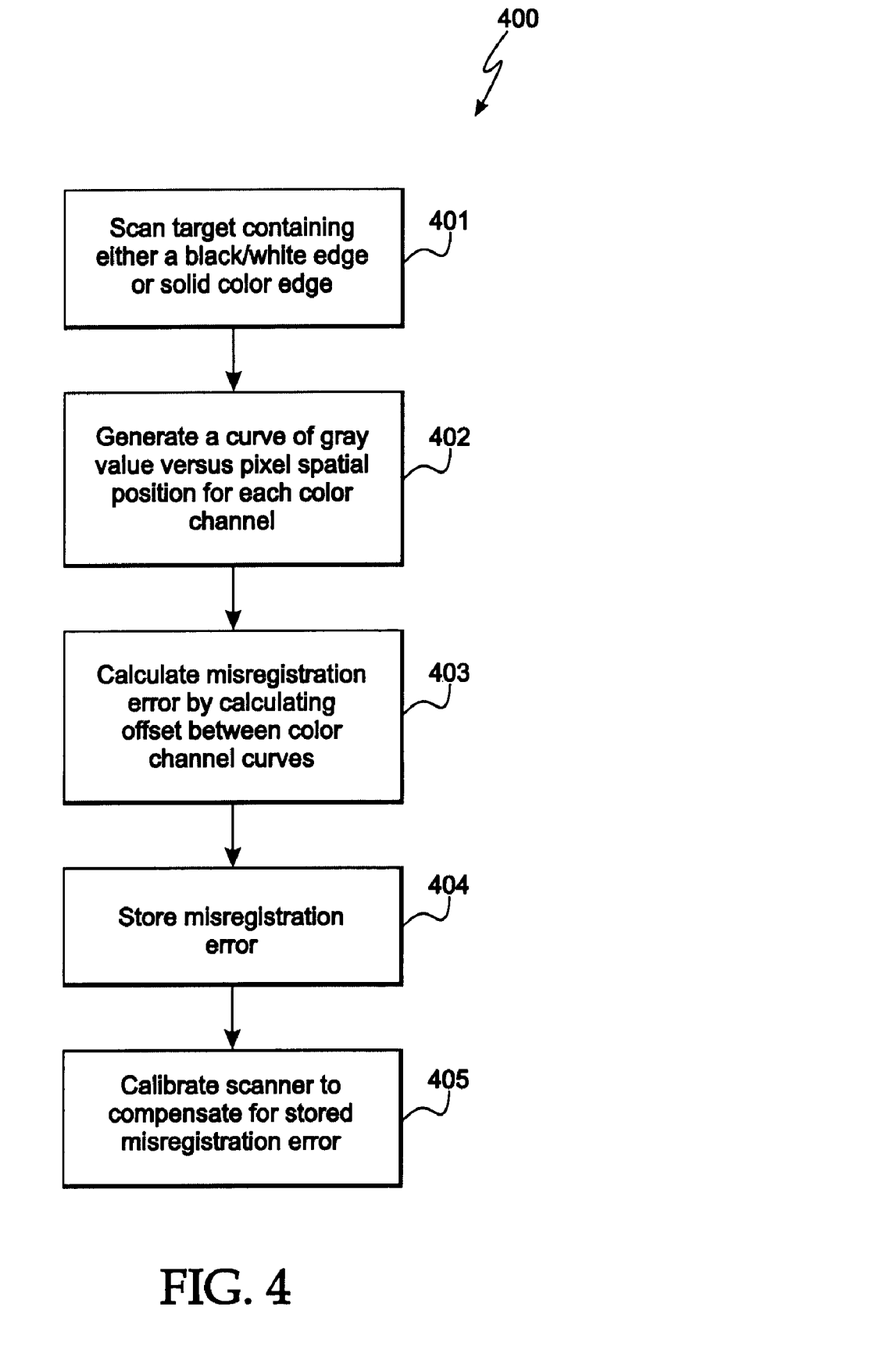
FIG. 4 is a flowchart of a method for detecting and compensating for color misregistration in accordance with an embodiment of the present invention.

FIG. 4—Method for Detecting and Compensating for Color Misregistration

FIG. 4 is a flowchart of one embodiment of the present invention of a method 400 for detecting and compensating for color misregistration.

Referring to FIG. 4, in conjunction with FIGS. 2 and 3, in step 401, a target, e.g., document, containing either a black/white edge or solid color edge is scanned. A target may refer to an image, e.g., graphic, picture, document, to be scanned that will be used to calibrate scanner 200 to compensate for any color misregistration detected. The target may either be an image to be scanned by a user or a prepared test image specifically used to calibrate scanner 200. A black/white edge refers to a black image, e.g., black text, on a white surrounding background having a rapid spatial transition from black to white. A solid color edge refers to a solid color image, e.g., solid color text, on a white surrounding background having a rapid spatial transition from color to white.

In step 402, a curve of gray values versus pixel spatial positions for each color channel, e.g., red, blue, green, is generated for the black/white edge or solid color edge scanned in step 401. Color channels refer to the digital images corresponding to each color produced by each set of linear CCD elements 305. For example, red color CCD array 305A may digitize the red light in a red plane (designated as "R or red channel"). Green color CCD array 305B may digitize the green light in a green plane (designated as "G or green channel"). Blue color CCD array 305C may digitize the blue light in a blue plane (designated as "B or blue channel"). An example of a curve of gray values versus pixel spatial positions for each color channel generated for a black/white edge scanned is illustrated in FIG. 5. FIG. 5 illustrates a plot of the various gray values versus the pixel positions for each color channel, red color channel 501, blue color channel 502 and green color channel 503. An example of a curve of gray values versus pixel spatial positions for each color channel (red, blue and green) generated for a solid color edge scanned in FIGS. 6A-B. FIG. 6A illustrates a plot of gray values versus the pixel positions for each color channel, red color channel 601, blue color channel 602 and green color channel 603, for the case of no color misregistration. As illustrated in FIG. 6A, there is no color misregistration if the curves for the red, blue and green channel 601, 602 and 603, respectively, converge to a point for gray level equal to zero. FIG. 6B illustrates a plot of gray values versus the pixel positions for each color channel, red color channel 601, blue color channel 602 and green color channel 603, for the case of color misregistration. As illustrated in FIG. 6B, there is color misregistration if the curves for the red, blue and green channel 601, 602 and 603, respectively, do not converge to a point for gray level equal to zero.

In step 403, a misregistration error is calculated by calculating the offset between the color channel curves generated in step 402. In one embodiment, the misregistration error between a first color channel, e.g., red color channel, and a second color channel, e.g., green color channel, for a black/white edge scanned (see FIG. 5) may be calculated using the following equation:

$$\text{Error} = \text{diff1}/\text{diff2} \tag{EQ 1}$$

where diff1 is equal to the difference in gray values at a particular pixel position between the first color channel and the second channel; and where diff2 is equal to the difference in gray values between neighboring pixel positions in the first color channel. The misregistration error may further be calculated between the second color channel, e.g., green color channel, and a third color channel, e.g., blue color channel, using EQ1. Similarly, the misregistration error between the first and third color channel may either be calculated by combining the two misregistration errors described above or directly using EQ1. These misregistration errors may be stored in memory in controller 205 in step 404.

Further, in one embodiment, the misregistration error between a first color channel, e.g., red color channel, and a second color channel, e.g., green color channel, for a solid color edge scanned (see FIG. 6) may be calculated using the following equation:

$$\text{Error} = \text{diff3}/\text{diff2} \tag{EQ2}$$

where diff3 is equal to the following equation:

$$\text{diff3} = (\text{GV0C2} * \text{diffGVC1}/\text{diffGVC2}) - \text{GV0C1} \tag{EQ3}$$

where GV0C2 is equal to the gray value at a particular pixel position for the second color channel; where diffGVC1 is equal to the difference in gray values between neighboring pixel positions in the first color channel; where diffGVC2 is equal to the difference in gray values between neighboring pixel positions in the second color channel; and where GV0C1 is equal to the gray value at a particular pixel position for the first color channel. The misregistration error may further be calculated between the second color channel, e.g., green color channel, and a third color channel, e.g., blue color channel, using EQ2. Again, the misregistration error between the first and third color channel may either be calculated by combining the two misregistration errors described above or directly using EQ2. These misregistration errors may be stored in memory in controller 205 in step 404.

In an alternative embodiment, the misregistration error between a first color channel, e.g., red color channel, and a second color channel, e.g., green color channel, for either the black/white edge scanned (see FIG. 5) or the solid color edge scanned (see FIG. 6) may be calculated by fitting a second order curve, or other fitting function such as a spline, to data points, e.g., three (3) data points, on the curve of gray values for the first and second color channels. Upon fitting the second order curve or other fitting function to the data points, a lateral shift required to align one or more of the data points used to form the second order curve in the first and second color channels may be determined. This lateral shift may represent the misregistration error. The misregistration error may further be calculated between the second color channel, e.g., green color channel, and a third color channel, e.g., blue color channel, using the above process. These misregistration errors may be stored in memory in controller 205 in step 404. It is noted that the misregistration errors may be either positive or negative depending on the reference color plane. It is further noted that misregistration errors may exist in both horizontal and vertical directions. It is further noted that the estimate of the misregistration errors may be improved by taking the average error for rising and falling edges. The estimate of the misregistration errors may be improved since multiple measurements of the same misregistration error are provided.

In step 405, the stored misregistration error(s) may be used to calibrate scanner 200 to compensate for the detected misregistration error(s).

It is noted that method 400 may be used to calibrate scanner 200 in a separate, stand alone procedure using a prepared test image or in conjunction with a user scanning an image, e.g., user scans an image (not a prepared test image) which is used to calibrate scanner 200. In a modular scan-print (copier) system, such as illustrated in system 100, end users have the flexibility of choosing different scanners and printers. By implementing the above algorithm in such a system, misregistration detection may be automated to ensure consistency between the different devices. With a simple "push of a button", end users may scan a prepared test image and have the information extracted from suitable portions of a user's document, e.g. black text. The algorithm calculates the corresponding misregistration error and the results may be used in a correction algorithm. The process may be part of a scanner calibration or stand alone procedure. End users may detect and correct color scanner misregistration errors easily, without involvement of specialized personnel. This reduces cost and gives more flexibility to the customer. It is further noted that method 400 may include other and/or additional steps that, for clarity, are not depicted. It is noted that method 400 may be executed in a different order presented and that the order presented in the discussion of FIG. 4 is illustrative. It is further noted that certain steps in method 400 may be executed in a substantially simultaneous manner.

Although the system, method and computer program product are described in connection with several embodiments, it is not intended to be limited to the specific forms set forth herein, but on the contrary, it is intended to cover such alternatives, modifications and equivalents, as can be reasonably included within the spirit and scope of the invention as defined by the appended claims. It is noted that the headings are used only for organizational purposes and not meant to limit the scope of the description or claims.

The invention claimed is:

1. A method for detecting and compensating for color misregistration comprising the steps of:
   scanning a target having a black/white edge or a solid color edge;
   generating a curve of gray values versus pixel spatial position for each color channel scanned on said black/white edge or on said solid color edge of a target;
   calculating a misregistration error by calculating an offset between color channels;
   calibrating a unit such as a scanner using said calculated misregistration error,
   wherein said misregistration error is calculated for said black/white edge scanned on said target, and wherein said misregistration error between a first color channel and a second color channel is equal to the equation:

$$error = diff1/diff2;$$

wherein diff1 is equal to the difference in gray values at a particular pixel position between said first color channel and said second color channel; and
   wherein diff2 is equal to the difference in gray values between neighboring pixel positions in said first color channel.

2. The method as recited in claim 1 further comprising the step of: storing said misregistration error.

3. The method as recited in claim 1, wherein said misregistration error is calculated for said solid color edge scanned on said target, and wherein said misregistration error between a first color channel and a second color channel is equal to the equation:

$$error = diff3/diff2$$

wherein diff3 is equal to the equation:

$$(GV0C2 * diffGVC1/diffGVC2) - GV0C1$$

wherein GV0C2 is equal to the gray value at a particular pixel position for said second color channel;
   wherein diffGVC1 is equal to the difference in gray values between neighboring pixel positions in said first color channel;
   wherein diffGVC2 is equal to the difference in gray values between neighboring pixel positions in said second color channel;
   and wherein GV0C1 is equal to the gray value at a particular pixel position for said first color channel;
   and wherein diff2 is equal to the difference in gray values between neighboring pixel positions in said first color channel.

4. The method as recited in claim 1, wherein said step of calculating said misregistration error comprises the steps of:
   fitting a second order curve to a plurality of data points on said curve of gray values for a first and a second color channel; and
   determining a lateral shift required to align one or more of said plurality of data points for said first and said second color channel.

5. A computer program product residing on computer-readable medium including computer-executable instructions for detecting and compensating for color misregistration comprising the programming steps of:
   generating a curve of gray values versus pixel spatial position for each color channel scanned on a black/white edge or on a solid color edge of a target;
   calculating a misregistration error by calculating an offset between color channels; and
   calibrating a unit such as a scanner using said calculated misregistration error,
   wherein said misregistration error is calculated for a scanned target having a black/white edge, and wherein said misregistration error between a first color channel and a second color channel is equal to the equation:

$$error = diff1/diff2$$

wherein diff1 is equal to the difference in gray values at a particular pixel position between said first color channel and said second color channel; and wherein diff2 is equal to the difference in gray values between neighboring pixel positions in said first color channel.

6. The computer program product as recited in claim 5 further comprising the programming step of: storing said misregistration error.

7. The computer program product as recited in claim 5, wherein said misregistration error is calculated for said solid color edge scanned on said target, and wherein said misregistration error between a first color channel and a second color channel is equal to the equation:

error=diff3/diff2 wherein diff3 is equal to the equation:

(GV0C2*diffGVC1/diffGVC2)−GV0C1 wherein GV0C2 is equal to the gray value at a particular pixel position for said second color channel;

wherein diffGVC1 is equal to the difference in gray values between neighboring pixel positions in said first color channel;

wherein diffGVC2 is equal to the difference in gray values between neighboring pixel positions in said second color channel; and wherein GV0C1 is equal to the gray value at a particular pixel position for said first color channel; and wherein diff2 is equal to the difference in gray values between neighboring pixel positions in said first color channel.

8. The computer program product as recited in claim 5, wherein said programming step of calculating said misregistration error comprises the programming steps of:

fitting a second order curve to a plurality of data points on said curve of gray values for a first and a second color channel; and determining a lateral shift required to align one or more of said plurality of data points for said first and said second color channel.

9. A system, comprising:

a memory operable for storing a computer program for detecting and compensating for color misregistration;

a processor coupled to said memory, wherein said processor, responsive to said computer program, comprises:

to circuitry operable for generating a curve of gray values versus pixel spatial position for each color channel scanned on a black/white edge or on a solid color edge of a target;

circuitry operable for calculating a misregistration error by calculating an offset between color channels; and circuitry operable for calibrating a unit such as a scanner using said calculated misregistration error, wherein said misregistration error is calculated for a scanned target having a black/white edge; and wherein said misregistration error between a first color channel and a second color channel is equal to the equation:

error=diff1/diff2 wherein diff1 is equal to the difference in gray values at a particular pixel position between said first color channel and said second color channel; and wherein diff2 is equal to the difference in gray values between neighboring pixel positions in said first color channel.

10. The system as recited in claim 9, wherein said processor further comprises:

circuitry operable for storing said misregistration error.

11. The system as recited in claim 9, wherein said misregistration error is calculated for solid color edge; and wherein said misregistration error between a first color channel and a second color channel is equal to the equation:

error=diff3/diff2 wherein diff3 is equal to the equation:

(GV0C2*diffGVC1/diffGVC2)−GV0C1 wherein GV0C2 is equal to the gray value at a particular pixel position for said second color channel;

wherein diffGVC1 is equal to the difference in gray values between neighboring pixel positions in said first color channel;

wherein diffGVC2 is equal to the difference in gray values between neighboring pixel positions in said second color channel; and wherein GV0C1 is equal to the gray value at a particular pixel position for said first color channel; and wherein diff2 is equal to the difference in gray values between neighboring pixel positions in said first color channel.

12. The system as recited in claim 9, wherein said circuitry operable for calculating said misregistration error comprises:

circuitry operable for fitting a second order curve to a plurality of data points on said curve of gray values for a first and a second color channel; and circuitry operable for determining a lateral shift required to align one or more of said plurality of data points for said first and said second color channel.

13. A scanner, comprising:

a reading unit, wherein said reading unit comprises:

an illumination source configured to emit light onto a surface; and a plurality of charge coupled device arrays configured to store electric charge from light reflected from said surface;

a controller coupled to said reading unit, wherein said controller is configured to sequentially activate said plurality of charge coupled device arrays, wherein said controller is further configured to output said electrical charge stored in said plurality of charge coupled device arrays as digital signals, wherein said controller comprises:

a memory operable for storing a computer program for detecting and compensating for color misregistration; and a processor coupled to said memory, wherein said processor, responsive to said computer program, comprises:

circuitry operable for generating a curve of gray values versus pixel spatial position for each color channel scanned on a target having a black/white edge or a solid color edge;

circuitry operable for calculating a misregistration error by calculating an offset between color channels; and circuitry operable for calibrating said scanner using said calculated misregistration error, wherein said misregistration error is calculated for said black/white edge on a scanned target, and wherein said misregistration error between a first color channel and a second color channel is equal to the equation:

error=diff1/diff2 wherein diff1 is equal to the difference in gray values at a particular pixel position between said first color channel and said second color channel; and wherein diff2 is equal to the difference in gray values between neighboring pixel positions in said first color channel.

14. The system as recited in claim 13, wherein said processor further comprises:

circuitry operable for storing said misregistration error.

15. The system as recited in claim 13, wherein said misregistration error is calculated for said solid color edge scanned on said target, wherein said misregistration error between a first color channel and a second color channel is equal to the equation:

$$error = diff3/diff2$$

wherein diff3 is equal to the equation:

$$(GV0C2 * diffGVC1/diffGVC2) - GV0C1$$

wherein GV0C2 is equal to the gray value at a particular pixel position for said second color channel;

wherein diffGVC1 is equal to the difference in gray values between neighboring pixel positions in said first color channel;

wherein diffGVC2 is equal to the difference in gray values between neighboring pixel positions in said second color channel; and wherein GV0C1 is equal to the gray value at a particular pixel position for said first color channel; and wherein diff2 is equal to the difference in gray values between neighboring pixel positions in said first color channel.

16. The system as recited in claim 13, wherein said circuitry operable for calculating said misregistration error comprises:

circuitry operable for fitting a second order curve to a plurality of data points on said curve of gray values for a first and a second color channel; and circuitry operable for determining a lateral shift required to align one or more of said plurality of data points for said first and said second color channel.

* * * * *

UNITED STATES PATENT AND TRADEMARK OFFICE
CERTIFICATE OF CORRECTION

| | | |
|---|---|---|
| PATENT NO. | : 7,400,430 B2 | Page 1 of 1 |
| APPLICATION NO. | : 10/672234 | |
| DATED | : July 15, 2008 | |
| INVENTOR(S) | : Czyszczewski et al. | |

It is certified that error appears in the above-identified patent and that said Letters Patent is hereby corrected as shown below:

At column 9, line 67, please insert --a scanned target having a-- between the words "for" and "solid color edge" to read --for a scanned target having a solid color edge--.

Signed and Sealed this

Fourth Day of November, 2008

JON W. DUDAS
*Director of the United States Patent and Trademark Office*